United States Patent
Nanda et al.

(10) Patent No.: US 10,164,908 B2
(45) Date of Patent: *Dec. 25, 2018

(54) FILTRATION OF NETWORK TRAFFIC USING VIRTUALLY-EXTENDED TERNARY CONTENT-ADDRESSABLE MEMORY (TCAM)

(71) Applicant: Gigamon Inc., Santa Clara, CA (US)

(72) Inventors: Avoy Nanda, Dublin, CA (US); Hoang Nguyen, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,364

(22) Filed: Oct. 26, 2017

(65) Prior Publication Data

US 2018/0054397 A1     Feb. 22, 2018

Related U.S. Application Data

(63) Continuation of application No. 14/931,502, filed on Nov. 3, 2015, now Pat. No. 9,813,357.

(51) Int. Cl.
*H04L 12/947*     (2013.01)

(52) U.S. Cl.
CPC .................. *H04L 49/25* (2013.01)

(58) Field of Classification Search
CPC ....................................................... H04L 49/25
See application file for complete search history.

(56) References Cited

U.S. PATENT DOCUMENTS

| | | | |
|---|---|---|---|
| 2006/0010491 A1* | 1/2006 | Prigent | H04L 12/40104 726/11 |
| 2011/0164533 A1 | 7/2011 | Krumel et al. | |
| 2012/0066487 A1 | 3/2012 | Brown et al. | |
| 2013/0265886 A1 | 10/2013 | Leong et al. | |
| 2013/0272135 A1* | 10/2013 | Leong | H04L 41/0823 370/241 |
| 2014/0366097 A1* | 12/2014 | Nguyen | H04L 63/10 726/4 |
| 2015/0207905 A1 | 7/2015 | Merchant et al. | |
| 2015/0215232 A1* | 7/2015 | Albrecht | H04L 41/082 709/225 |
| 2016/0094418 A1 | 3/2016 | Raney | |
| 2016/0099898 A1* | 4/2016 | Watanabe | H04L 51/12 709/204 |

(Continued)

*Primary Examiner* — Brian D Nguyen
(74) *Attorney, Agent, or Firm* — Perkins Coie LLP

(57) ABSTRACT

Ternary content-addressable memory (TCAM) of an ingress appliance in a visibility fabric may include rules for filtering traffic received by the ingress appliance. But the TCAM has limited space for rules and can become easily exhausted. By migrating rules to other visibility nodes in the visibility fabric, the techniques introduced here allow the TCAM to be virtually extended across multiple visibility nodes. More specifically, upon receiving a data packet at an ingress port, the ingress visibility node can tag the data packet with an identifier based on which ingress port received the data packet. The ingress visibility node can then determine, based on the identifier, whether the data packet should be filtered using a rule stored in the TCAM of the ingress visibility node or a rule stored in the TCAM of some visibility node in the visibility fabric.

20 Claims, 8 Drawing Sheets

(56) References Cited

U.S. PATENT DOCUMENTS

2016/0105311 A1* 4/2016 Thakkar .............. H04L 41/0813
                                                    709/222
2016/0191521 A1   6/2016 Feroz et al.
2016/0285713 A1   9/2016 Merchant et al.
2017/0048116 A1* 2/2017 Anderson ............. H04L 43/028

* cited by examiner

FILTRATION OF NETWORK TRAFFIC USING VIRTUALLY-EXTENDED TERNARY CONTENT-ADDRESSABLE MEMORY (TCAM)

CROSS REFERENCE TO RELATED APPLICATIONS

This application is a continuation of U.S. patent application Ser. No. 14/931,502 filed on Nov. 3, 2015, which issued as U.S. Pat. No. 9,813,357, on Nov. 7, 2017, which is herein incorporated by reference in its entirety.

FIELD OF THE INVENTION

At least one embodiment of the present disclosure pertains to systems and techniques for filtering network traffic, and more particularly, to techniques for filtering network traffic using rules distributed across multiple network appliances.

BACKGROUND

Traffic in a computer network can be analyzed in order to improve real-time decision-making for network operations, security techniques, etc. Often the traffic is acquired at numerous entry points by a variety of devices and/or applications to provide extensive visibility of network flow and security. This network of devices and appliances, which may include physical devices, virtual devices, and Software Defined Networking (SDN)/Network Functions Virtualization (NFV) environments, may be collectively referred to as the computer network's visibility fabric. Given the complexity often present in many network infrastructures, it is increasingly important to have a management model that provides visibility into infrastructure blind spots and allows responsive action to be rapidly applied.

A common scenario in a computer network involves a network appliance receiving a stream of data packets (e.g., from a network tap) and filtering the data packets (among other possible functions) by applying filtering rules that reside within an internal ternary content-addressable memory (TCAM) of the network appliance. Filtering may be done for various purposes, such as monitoring network flow, managing network operations, and identifying security threats to the computer network. Efficient and effective traffic filtering is more important than ever before, particularly in light of increases in the amount of traffic generally traversing computer networks, the danger posed by security threats to computer networks, and the complexity of those security threats.

The TCAM commonly used to store filtering rules in a network appliance is, however, limited in the number of filtering rules that it can store. Consequently, the filtering capabilities of the network appliance, and therefore the visibility fabric as a whole, are also limited.

Traffic traversing a computer network is often filtered and analyzed to identify security threats and/or bottlenecks in the flow and take appropriate action(s). Generally, an edge device (e.g., router, firewall, network tap) is configured to examine the traffic at an access point and to create a copy of the traffic for further analysis. For example, the copied stream of data packets may be transmitted to a visibility fabric that includes one or more network appliances (also referred to herein as "visibility nodes") that filter and/or analyze the data packets. The visibility fabric typically does not include the edge devices (sometimes referred to as "source nodes") that exchange data on the computer network or tools configured to analyze the stream of data packets after they have been filtered (also referred to as "destination nodes"). The network appliances can also be configured to forward some or all of the data packets downstream for further analysis.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
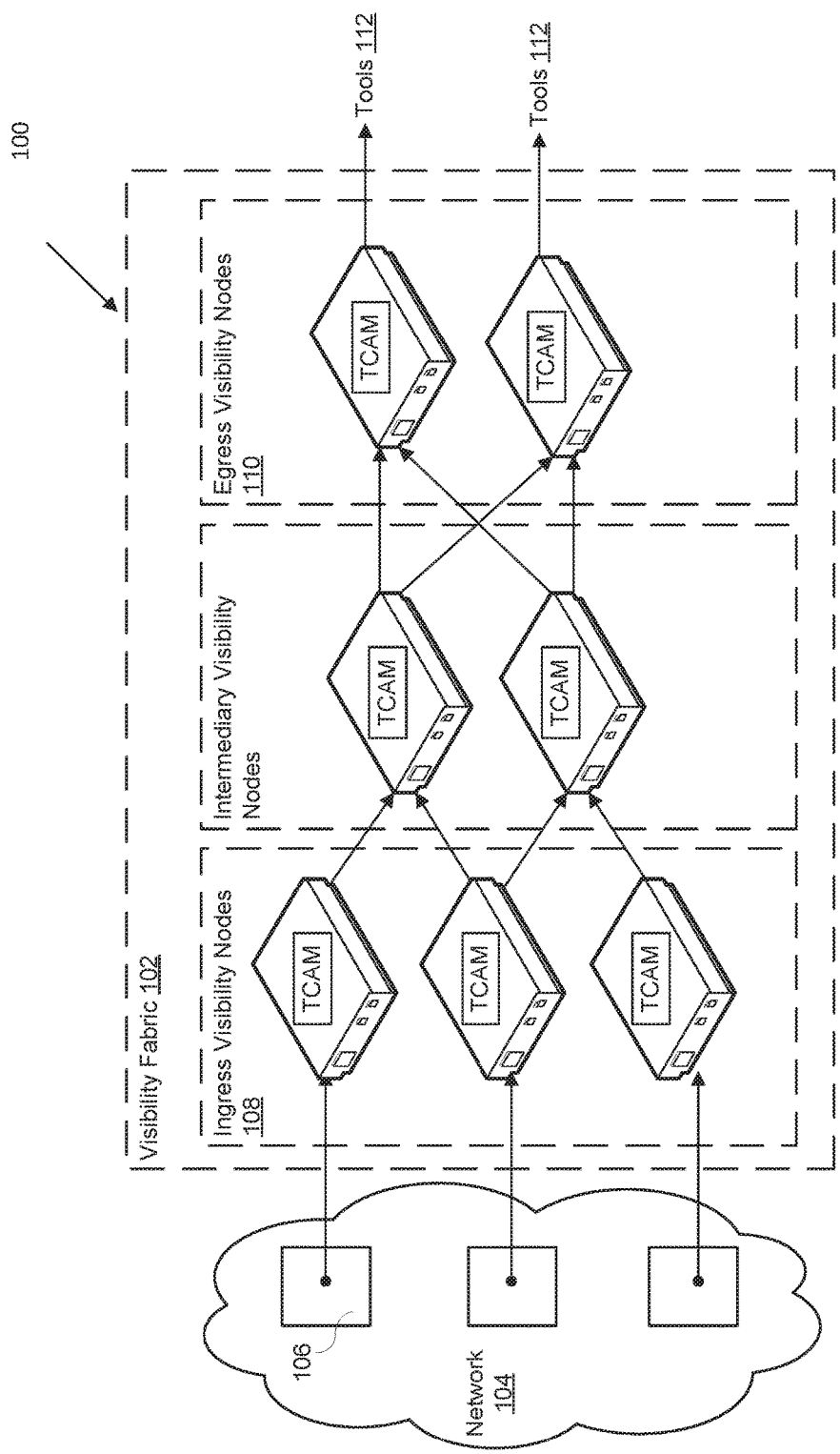
FIG. 1 depicts an environment in which an out-of-band visibility fabric monitors and filters traffic transmitted across a computer network.

In this description, references to "an embodiment," "one embodiment," and the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

A network visibility fabric node may be designed with the flexibility to function in various different modes or roles (e.g., as either an ingress visibility node or a non-ingress visibility node), and therefore, such visibility nodes typically include TCAMs. Conventionally, however, only the ingress visibility nodes in a visibility fabric (i.e., those visibility nodes that receive a stream of data packets from an edge device) would perform filtering, so the TCAMs on all other nodes in the visibility fabric normally remained empty. In accordance with the techniques introduced here, therefore, unused TCAM storage space in the non-ingress visibility nodes of a visibility fabric are used to virtually-extend TCAM-based storage space for filtering rules, across the visibility fabric and to make better use of the TCAM space already present. The methods and systems (collectively, the "techniques") described herein enable a mechanism by which TCAM from peer nodes within a visibility fabric can be used to store filtering rules that are used (e.g., by a processor) to filter data packets when the TCAM space on the ingress visibility node(s) is exhausted. The ingress visibility nodes are those nodes that are configured to receive a stream of data packets (e.g., from an edge device) that represents the traffic in a computer network. The non-ingress visibility nodes include all other nodes within the visibility fabric. By employing the techniques described herein, additional rules can be stored and used to filter incoming traffic in a visibility fabric, thereby extending the functionality of the visibility fabric, while also reducing the amount of unused empty TCAM space in the visibility fabric.

More specifically, in certain embodiments, upon receiving a data packet at an ingress port, an ingress visibility node can tag the data packet with an identifier. The identifier is a metadata field that is appended to the data packet while it traverses the visibility nodes of the visibility fabric. The identifier is based, in whole or in part, upon which ingress port received the data packet. Based on the identifier, the ingress visibility node can then determine whether the data packet should be filtered using one or more rules stored within the TCAM of the ingress visibility node, or one or more rules stored within the TCAM of some other visibility node, such as a non-ingress visibility node. In some embodiments, the data packet may be filtered using rules distributed amongst multiple visibility nodes.

Upon determining the data packet should be filtered locally (i.e., by the ingress visibility node), the ingress visibility node applies a rule, which specifies, for example, whether the data packet should be dropped or transmitted downstream for further analysis. The ingress visibility node could transmit the data packet downstream to another visibility node, such as an egress visibility node in the visibility fabric, or directly to a tool configured to analyze the computer network based on the data packet. An egress visibility node is communicatively coupled to at least one destination source that resides outside of the visibility fabric, such as a tool. However, upon determining the data packet should be filtered remotely (i.e., by some other visibility node), the ingress visibility node transmits the data packet downstream where it is subsequently filtered by another visibility node using a rule stored in the TCAM of the other visibility node. This other visibility node could be another ingress visibility node, an egress visibility node communicatively coupled to one or more tools, or any other visibility node in the visibility fabric. Generally, the data packet is sent to an egress visibility node, which may filter the data packet as described above, before being transmitted to a tool (e.g., a monitoring and/or security related tool) communicatively coupled to the egress visibility node. In some embodiments, the egress visibility node is configured to strip the above-mentioned identifier from the data packet before the packet leaves the visibility fabric (i.e., before it is transmitted to the tool). Although the techniques described herein can be used to extend the space available for filtering rules, the techniques are not necessarily limited to extending space for filtering rules. That is, the techniques can be used to virtually extend storage space more broadly (e.g., for storing tables, databases).

The techniques introduced herein also permit the rules to be dynamically relocated based on whether TCAM space is available on the ingress visibility node(s) of the visibility fabric. For example, a rule can be imported to an ingress visibility node when TCAM space becomes available. As another example, a rule can be exported from the ingress visibility node to another visibility node when TCAM space becomes entirely or substantially exhausted in the ingress visibility node. The imported/exported rule may be part of a group of rules to be applied to data packets having a particular identifier. In such embodiments, a given rule might not be moved unless sufficient space exists in the TCAM of the target visibility node for the entire group of rules of which the given rule is a member. The space allocated to rules by each TCAM in the visibility fabric may also be adaptively changed based on one or more factors, such as bandwidth optimization of a stack link between visibility nodes, available TCAM space in the ingress visibility node(s), location of an application configured to process data packets from a particular source, etc.

FIG. 1 depicts an environment 100 in which an out-of-band visibility fabric 102 monitors and filters traffic transmitted across a computer network 104 (e.g., of a data center). The traffic is directed to the visibility fabric by a physical edge device 106 that provides an entry point into the computer network 104 and passes a stream of data packets to the visibility fabric 102 for analysis. Examples of edge devices include routers, switches, and network taps. Each entry point represents an instance where an edge device 106 accesses or "taps" into the computer network 104. As shown by FIG. 1, the entry points could be, and often are, from different points within the computer network 104. Generally, each edge device 106 is configured to create a copy of the traffic received at the corresponding entry point, and then direct the copy of the traffic to the visibility fabric 102 for analysis. Because the original traffic continues to traverse the computer network 104 uninterrupted, the visibility nodes in the visibility fabric 102 are able to ignore certain traffic when filtering the data packets that make up the copied data stream.

The visibility fabric 102, meanwhile, includes network appliances or "visibility nodes" that together filter data packets and direct the filtered data packets to a tool for further analysis. Each node can be, for example, a monitoring platform that includes a chassis and interchangeable blades offering various functionalities, such as enhanced packet distribution and masking/filtering capabilities. The visibility nodes generally fall into three categories: ingress visibility nodes 108; egress visibility nodes 110; and intermediary visibility nodes communicatively coupled to other nodes in the visibility fabric 102. Together, the egress visibility nodes 110 and the intermediary visibility nodes can also be referred to as non-ingress visibility nodes. Although FIG. 1 depicts the ingress visibility nodes 108 being linked directly to the egress visibility nodes 110, one or more intermediary visibility nodes may also be present in the visibility fabric 102, thereby creating a multi-tiered visibility fabric 102. Ingress visibility nodes 108 receive a stream of data packets from an edge device 106, while the egress visibility nodes transmit filtered data packets downstream (e.g., to a tool 112 for further analysis). Generally, an administrator who is responsible for constructing and/or managing the visibility fabric 102 knows where the data packets received by the ingress visibility node(s) 18 originate from. The tools 108, which are typically managed by a third-party (i.e., neither the administrator of the network, nor the supplier of the visibility nodes), could be part of an intrusion detection system (IDS), an intrusion prevention system (IPS), etc.

As illustrated by FIG. 1, each of the visibility nodes in the visibility fabric 102 preferably includes a TCAM configured to store a predetermined number of entries. Each entry represents a different rule for filtering data packets. A TCAM could, for example, be limited to 2,000 or 4,000 entries. When applied to a data packet, each rule specifies whether the data packet should be dropped or passed downstream (e.g., to another visibility node or to a tool 112).

Traditionally, only those TCAMs associated with ingress visibility node(s) 108 included rules, and, consequently, the ingress visibility node(s) 108 were solely responsible for applying the rules and filtering network traffic. The techniques described herein, however, allow the rules to be distributed across some or all of the visibility nodes within the visibility fabric, including the egress visibility node(s) 110 and/or intermediary node(s). Accordingly, data packets can be filtered at an ingress visibility node, an egress visibility node, an intermediary visibility node, or any combination thereof. By virtually extending the TCAM space available for rules across a greater number of visibility nodes within the visibility fabric 102, data packets can be subjected to more intensive filtering. Additional filtering can provide numerous benefits, including quicker and more accurate identification of computer network security threats, bottlenecks in the computer network 104, optimal operating parameters for the computer network 104, etc.

Figure 2:
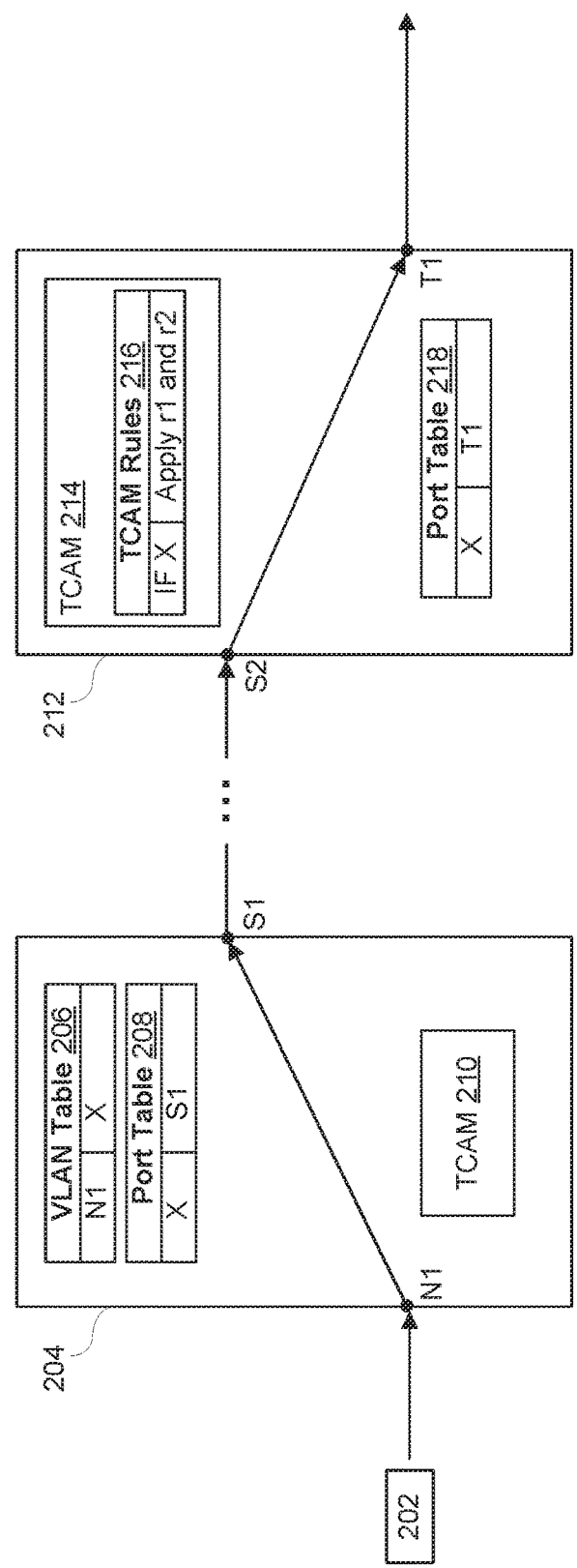
FIG. 2 illustrates how the techniques introduced herein can be used to filter data packets at an intermediary node or an egress node by tagging incoming data packets with an identifier based on which ingress port received the data packet.

FIG. 2 illustrates how the techniques described herein can be used to filter data packets at an intermediary visibility node or an egress visibility node by tagging incoming data packets with an identifier based on which ingress port received the data packet. More specifically, TCAM space in a visibility fabric can be increased by borrowing storage space distributed across various non-ingress visibility nodes in the visibility fabric.

First, a data packet 202 is received at an ingress port (N1) of an ingress visibility node 204 in the visibility fabric. As described above, the data packet 202 is typically part of a stream of data packets that are transmitted to the ingress visibility node 204 by an edge device (also referred to as a "source node") that is not part of the visibility fabric.

After receiving the data packet 202, the ingress visibility node 204 tags the data packet 202 with an identifier based on which ingress port received the data packets. Here, for example, the data packet is received at ingress port N1 and is thus tagged with the identifier "X." Each ingress port of the ingress visibility node 204 is associated with a unique port identifier. The unique port identifiers allow the ingress visibility node 204 to specify which ingress port a particular data packet was received by. More specifically, the identifier is a metadata field that is added to the data packet 202 when it enters the visibility fabric and is stripped from the data packet 202 before it leaves the visibility fabric (e.g., is transmitted to a tool). While any known identification scheme could be used to generate the identifiers, particular identification schemes may be preferable in certain instances. For instance, the ingress appliance 204 may include a table 206 that maps each ingress port to a Virtual Local Area Network (VLAN) identifier, multicast address, or both. The identifier is then used to determine whether the data packet 202 should be filtered using rules stored within the TCAM 210 of the ingress visibility node 204 or rules stored within the TCAM 214 of another visibility node 212 in the visibility fabric.

Upon determining the data packet 202 should be filtered using a rule 216 stored on another visibility node, the ingress visibility node 204 identifies the appropriate egress port so that the data packet 202 arrives at the correct destination. For example, this could be accomplished using an egress port table 208 that maps each identifier to an egress port. Here, the identifier "X" has been mapped to egress port S1. In some embodiments, the egress ports of the ingress visibility node 204 are communicatively coupled to the ingress ports of other visibility node by stack links (i.e., physical cables) extending directly between the two ports. Note, however, that such embodiments typically require an understanding of how the visibility nodes within the visibility fabric are linked to one another in order to correctly relay incoming data packets to the appropriate visibility node for filtering.

The data packet is subsequently received at the ingress port of some other visibility node (here, the data packet is received at ingress port S2). The data packet may be received directly from the ingress visibility node (e.g., via a direct stack link) or indirectly through an intermediary visibility node.

After the data packet 202 is received by the other visibility node 212, a rule 216 stored within the TCAM 214 of the other visibility node 212 is applied based on the identifier with which the data packet 202 is tagged. Here, for example, the other visibility node 212 applies two rules (r1 and r2) to filter the data packet 202 upon determining the data packet 202 has been tagged with the identifier "X." Using an egress port table 218, the other visibility node 212 can then direct the filtered data packet to an egress port (here, egress port T1). As noted above, the egress port may direct the filtered data packet 202 downstream to another visibility node or to a tool for further analysis. If the egress port is configured to transmit the filtered data packet directly to the tool, the egress port may also be referred to as a "tool port."

Figure 3:
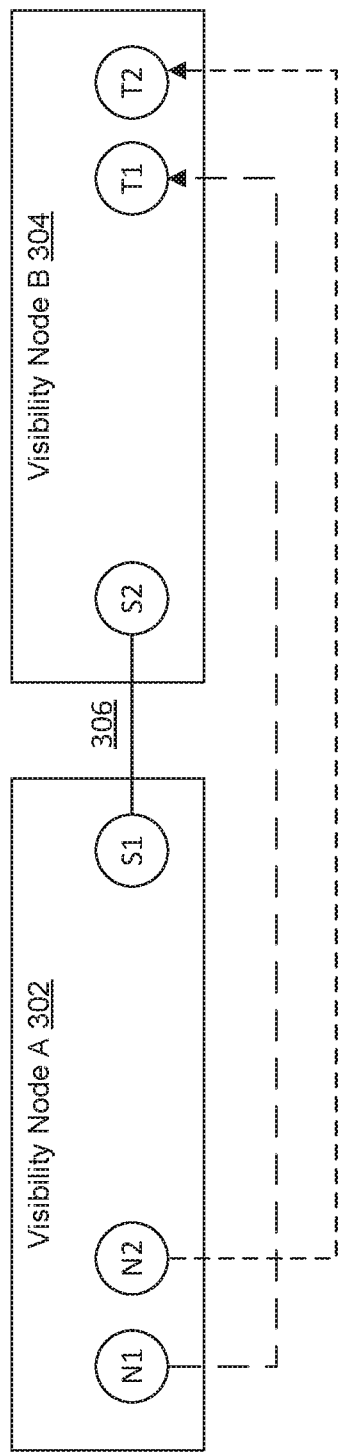
FIG. 3 shows a high-level depiction of ingress ports linked to specific egress ports for output to particular destination nodes.

FIG. 3 shows a high-level depiction of ingress ports linked to specific egress ports for output to a particular destination, such as a visibility node in the visibility fabric or a tool. This can be accomplished by tagging the data packets at an ingress visibility node (Visibility Node A 302) based on which ingress port (e.g., N1, N2) received the data packets. The identifier may be used to guide the data packets through the visibility fabric (e.g., via stack links 306 between the visibility nodes), from the ingress ports (N1, N2) of Visibility Node A 302 to the egress ports (T1, T2) of Visibility Node B 304. Thus, the identifiers effectively map the ingress ports of Visibility Node A 302 to the egress ports of Visibility Node B 304, as well as specify which visibility node(s) are responsible for applying rules to filter the stream of data packets. Generally, data packets received at a particular ingress port are filtered either locally by Visibility Node A 302 or remotely by Visibility Node B 304. However, in some embodiments, the rules to be applied to data packets having a particular identifier are distributed between two or more visibility nodes and, as such, those data packets are filtered by different visibility nodes.

Figure 4:
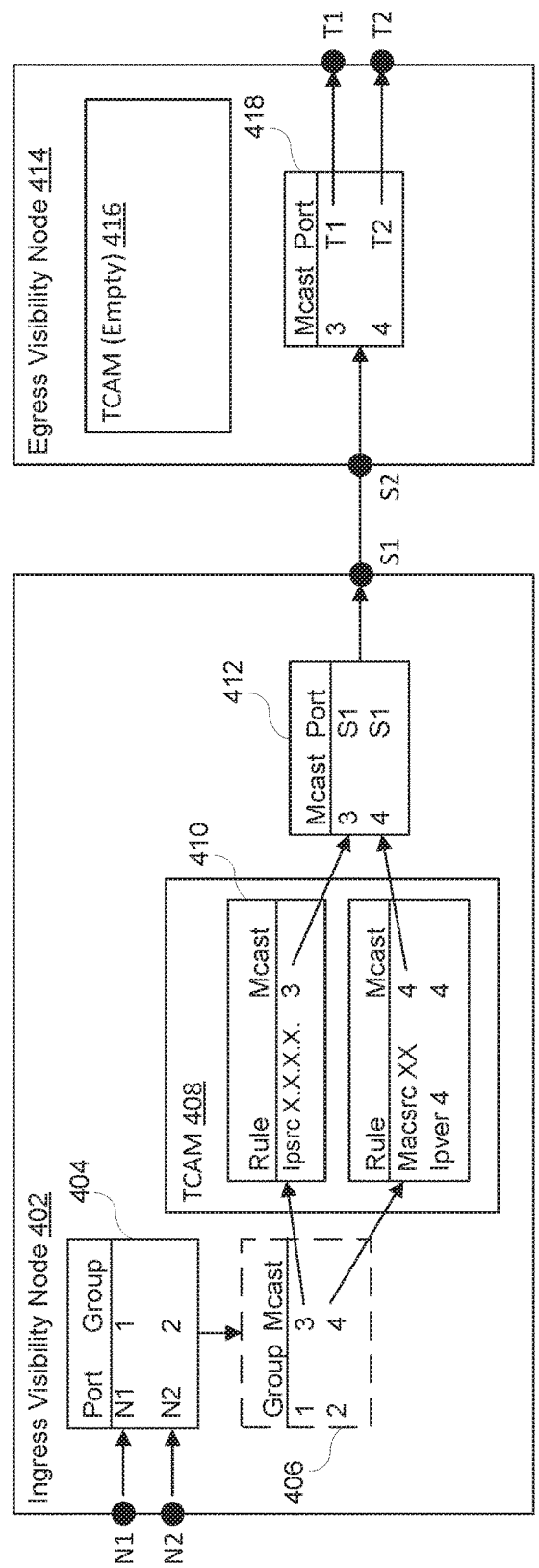
FIG. 4 illustrates how filtering is conventionally handled using only rules stored in the TCAM of an ingress appliance.

FIG. 4 illustrates how filtering is conventionally handled using only rules 410 stored in the TCAM 408 of the ingress visibility node 402. More specifically, FIG. 4 shows an ingress visibility node 402 that is solely responsible for applying rules and filtering the data packets. A stream of traffic composed of data packets is initially received by the ingress appliance 402 at an ingress port (e.g., N1). In some embodiments, the ingress visibility node 402 is able to receive streams of traffic at more than one ingress port (e.g., N1 and N2).

Once the stream of data packets is received by the ingress visibility node 402, the data packets can be associated with a group (e.g., using a group table 404) based on the ingress port on which the data packets were received. Here, for example, the data packets received at port N1 are associated with Group 1, while the data packets received at port N2 are associated with Group 2. Generally, each group is also mapped to a unique multicast address (e.g., in a multicast address table 406) that is used to refer to the data packets as they travel across the visibility nodes in the visibility fabric.

The group and/or the multicast address with which the data packets are tagged specify which rules 410 are to be applied to the data packets. The rules 410, which are stored in the TCAM 408 of the ingress visibility node 402, may specify whether the ingress visibility node 402 should drop the data packet or transmit the data packet downstream for further analysis, processing, etc. Those data packets that are not dropped by the ingress visibility node (i.e., survive the filtering process) are then directed to an egress port (here, egress port S1) for transmission downstream. The appropriate egress port could be determined using an egress port table 412 that maps groups and/or multicast addresses to specific egress ports.

The egress port of the ingress visibility node 402 is communicatively coupled to an ingress port of at least one other visibility node (here, egress visibility node 414). Because the TCAM 416 of the egress visibility node 414 does not include any rules, the egress visibility node 414 simply determines which egress port the filtered data packets should be directed to (e.g., using an egress port table 418) and relays the filtered data packets further downstream. The egress ports (e.g., T1 and T2) may be linked to particular tools for analyzing traffic flow within the computer network, identifying security threats, etc.

Figure 5:
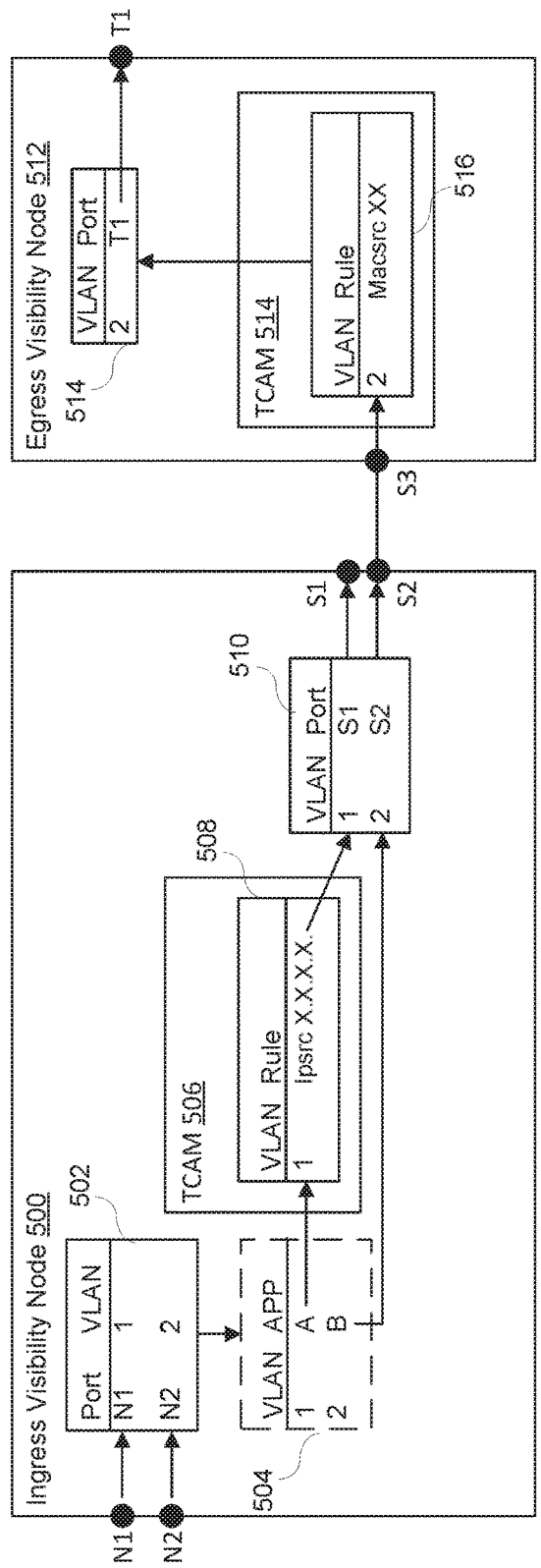
FIG. 5 illustrates how filtering can be performed by an ingress appliance and/or an egress appliance in accordance with the techniques introduced herein.

FIG. 5 illustrates how filtering can be performed by an ingress visibility node 502 and/or an egress visibility node 514 in accordance with the techniques introduced herein. Note that although FIG. 5 depicts the filtering being performed by an ingress visibility node 502 and an egress visibility node 514, the filtering could instead be performed by any combination of ingress visibility nodes and non-ingress visibility nodes (i.e., egress visibility nodes and intermediary visibility nodes). By using TCAM space distributed amongst various visibility nodes in the visibility fabric, the size of the rules table used to filter the data packets can be increased substantially.

When a data packet is received by the ingress visibility node 502 (e.g., at ingress ports N1), it is tagged with an identifier 504. The identifier 504, which is based on the ingress port on which the data packet was received, is used to ensure the data packet is filtered by a particular rule or set of rules. For example, all data packets received from a certain source at a particular ingress port can be mapped to a particular egress port for forwarding to another visibility node in the visibility fabric. The certain source may be a specific edge device, computer network, entry point into the computer network, etc. In some embodiments, each identifier is mapped to the visibility node configured to filter the data packets tagged with the identifiers. Each identifier could also be associated with a multicast identifier that allows the data packets to more easily traverse the visibility fabric.

Here, for instance, data packets received at ingress port N1 are tagged with an identifier (VLAN 1) that causes the data packets to be filtered using a rule 510 stored in the TCAM 508 of the ingress visibility node 502. However, data packets received at ingress port N2 are tagged with a different identifier (VLAN 2) that causes the data packets to be forwarded downstream for filtering by an egress visibility node 514. More specifically, those data packets tagged with VLAN 2 are mapped to egress port S2 (e.g., by an egress port table 512), which is communicatively coupled to ingress port S3 of the egress visibility node 514. Egress port S2 and ingress port S3 could be coupled to one another via a stack link that travels directly between the ingress visibility node 502 and the egress visibility node 514. Alternatively, egress port S2 and ingress port S3 could be coupled to one another through one or more intermediary visibility nodes. Once the data packets have been filtered, the egress visibility node 514 identifies the appropriate egress port (e.g., using an egress port table 520) and direct the data packets to egress port T1, which causes the data packets to be transmitted downstream to another visibility node or a tool configured to analyze traffic flow within the computer network from which the data packets originated.

Figure 6:
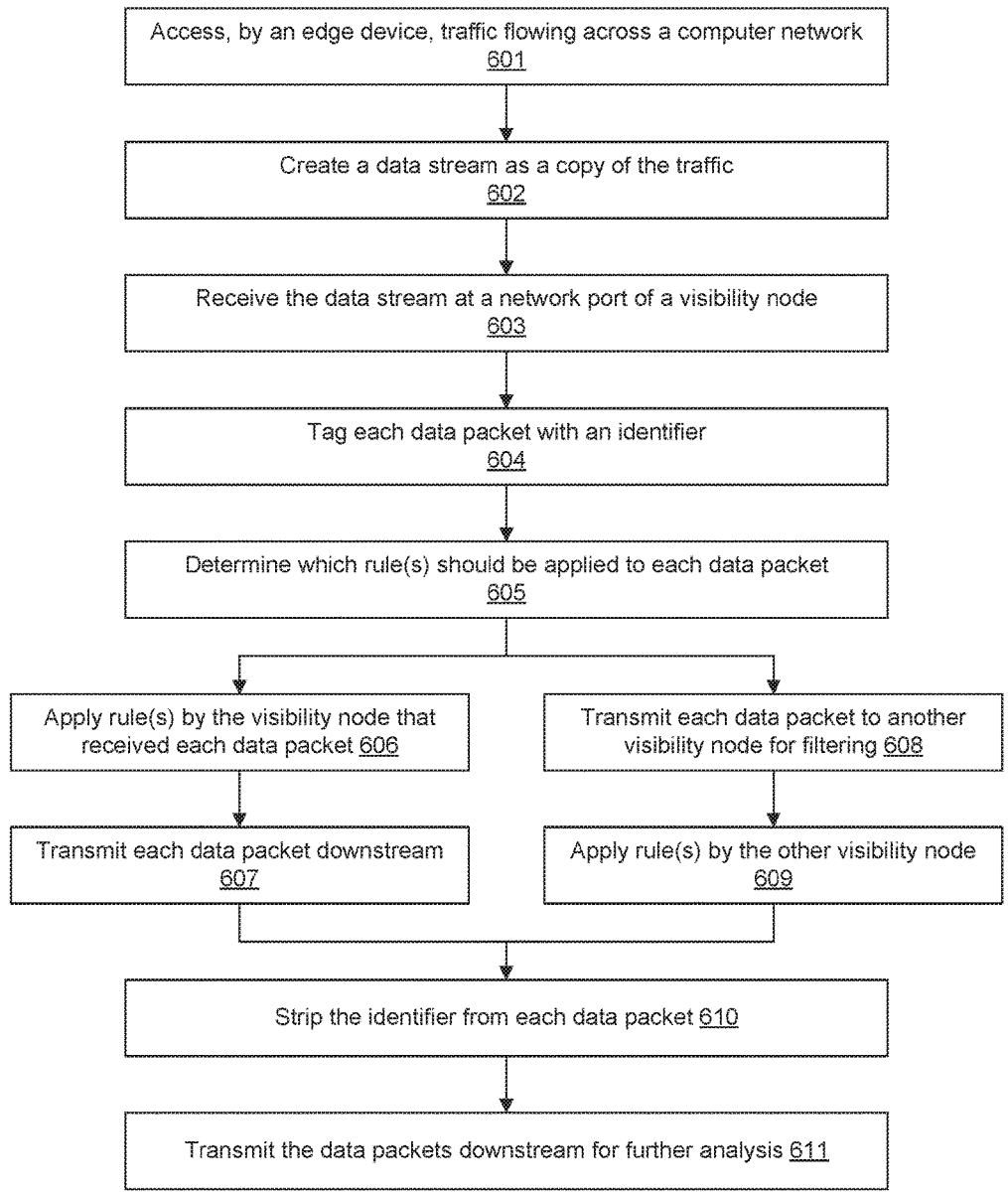
FIG. 6 depicts a process in which a determination is made of whether to filter a data packet by a visibility node that receives the data packet or another visibility node within a visibility fabric.

FIG. 6 depicts a process in which a determination is made of whether to filter a data packet by a visibility node that receives the data packet or another visibility node within a visibility fabric. As described above, a human being initially inputs (via a computer or other device) a series of filtering rules that are stored in the TCAMs of visibility nodes in a visibility fabric. The location of these filtering rules determines where (i.e., by which visibility node) each data packet is filtered. The human being who enters the filtering rules typically understands how the visibility nodes within the visibility fabric are linked to one another and, as such, is able to ensure the filtering rule(s) are stored in the correct visibility node.

An edge device (e.g., router, firewall, network tap) accesses traffic flowing across a computer network (step 601). The computer network may be a private or public network. For example, the computer network could be part of a data center configured to monitor traffic within an enterprise's computer network. Generally, the edge device creates a stream of data packets that represents a copy of the traffic (step 602). The stream of data packets is transmitted to a visibility node (i.e., an ingress visibility node) of a visibility fabric that receives the data packets at a network port (step 603).

The visibility node then tags each data packet with an identifier based on the network port on which the data packet was received (step 604). The number of unique identifiers available to the visibility node corresponds to the number of ingress ports of the visibility node. As described above, the identifier allows the data packet to be directed to the proper visibility nodes as the data packet travels through the visibility fabric. The visibility node then determines whether the data packet should be filtered locally (e.g., using a first set of rules stored in the TCAM of the visibility node) or remotely (e.g., using a second set of rules stored in the TCAM of some other visibility node) (step 605). In some embodiments the determination is based entirely on the identifier with which the data packet is tagged, while in other embodiments the determination is based at least in part on the identifier.

If the visibility node determines the data packet is to be filtered locally, the visibility node applies a rule (e.g., from the first set of rules) (step 606) and then transmits the filtered data packet downstream to another visibility node or to a tool for further analysis (step 607). If, however, the visibility node determines the data packet is to be filtered remotely, the visibility node transmits the data packet to another visibility node within the visibility fabric(step 608), which applies a different rule (e.g., from the second set of rules) to filter the data packet (step 609).

After the data packet has been filtered, the identifier can be stripped from the data packet (step 610). The visibility node that tagged the data packet, the visibility node that applied the rule(s) to the data packet, or some other visibility node could be configured to strip the identifier from the data packet. The data packets are then transmitted downstream for further analysis (step 611).

Figure 7:
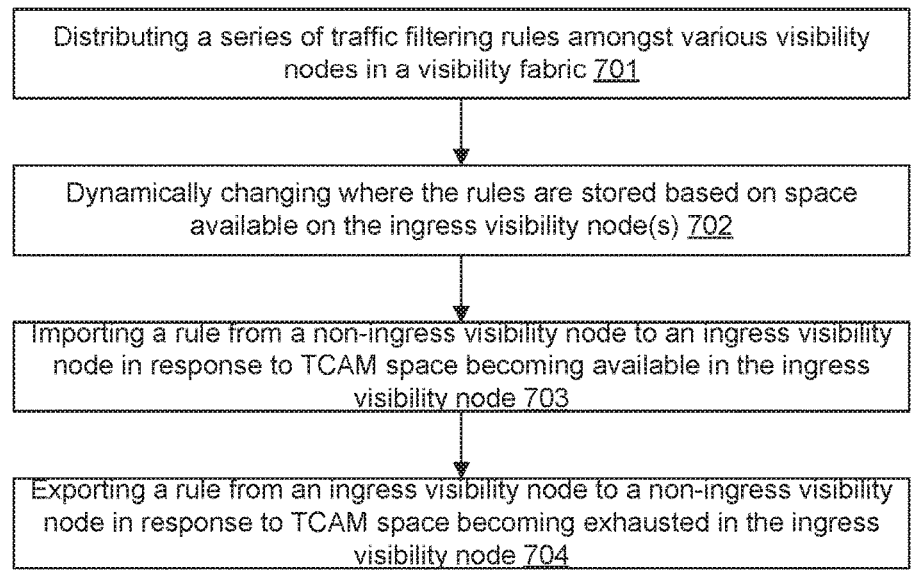
FIG. 7 shows a process by which filtering rules are moved between visibility nodes in a visibility fabric.

FIG. 7 shows a process by which filtering rules are moved between visibility nodes in a visibility fabric. As described above, a human being initially inputs (via a computer or other device) a series of filtering rules to be used to filter data packets representing traffic in a computer network (step 701). A designated master visibility node in the visibility fabric may be configured to continually monitor which visibility nodes have available TCAM space, thereby allowing filtering rules to be moved from one visibility node to another based on available TCAM space. The initial storage location of these rules could be determined by the human being, a visibility node (e.g., the master visibility node) in the visibility fabric, or some combination thereof. For example, one or more visibility nodes may be recommended to the human being, who ultimately elects where the rules are stored.

In some embodiments, the visibility node in the visibility fabric are able to dynamically change where the rules are stored based on the TCAM space available in each visibility node (step 702). For example, a rule could be imported from a non-ingress visibility node (e.g., an egress visibility node) to an ingress visibility node in response to TCAM space becoming available in the ingress visibility node (step 703). Oftentimes, this is determined by identifying whether the number of rules in the TCAM of the ingress visibility node falls below a baseline. Moreover, in some embodiments, the rule is only imported if there is sufficient space for a group of rules of which the rule is a member. As another example, a rule could be exported from an ingress visibility node to a non-ingress visibility node in response to TCAM space becoming exhausted in the ingress visibility node. Exhaustion may occur when the number of filtering rules in the TCAM exceeds a predetermined threshold (i.e., when the TCAM nears capacity). Although it is generally preferable for data packets to be filtered on a single visibility node, there may be instances where a data packet is filtered by more than one visibility node.

The storage location of the rules could also be adaptively changed based on some other criterion. For example, the rules may be allocated amongst the visibility nodes to optimize bandwidth utilization (e.g., of a stack link) between visibility nodes in the visibility fabric, memory available in the TCAMs of the ingress visibility node(s), or location of an application configured to process the data packet. Unlike the tools described above, applications are executed by the visibility nodes in the visibility fabric. An application could be configured to process the data packets, either before or after filtering. Oftentimes, it is preferable for the data packet to be filtered and analyzed by an application in the same visibility node. The application may be configured to perform various tasks, such as eliminating duplicate copies of data (i.e., deduplication), header stripping, offsetting (e.g., retain only the first 100 bytes of each data packet), tunneling, flow mapping or Advanced Packet Filtering (APF), time stamping, etc.

Figure 8:
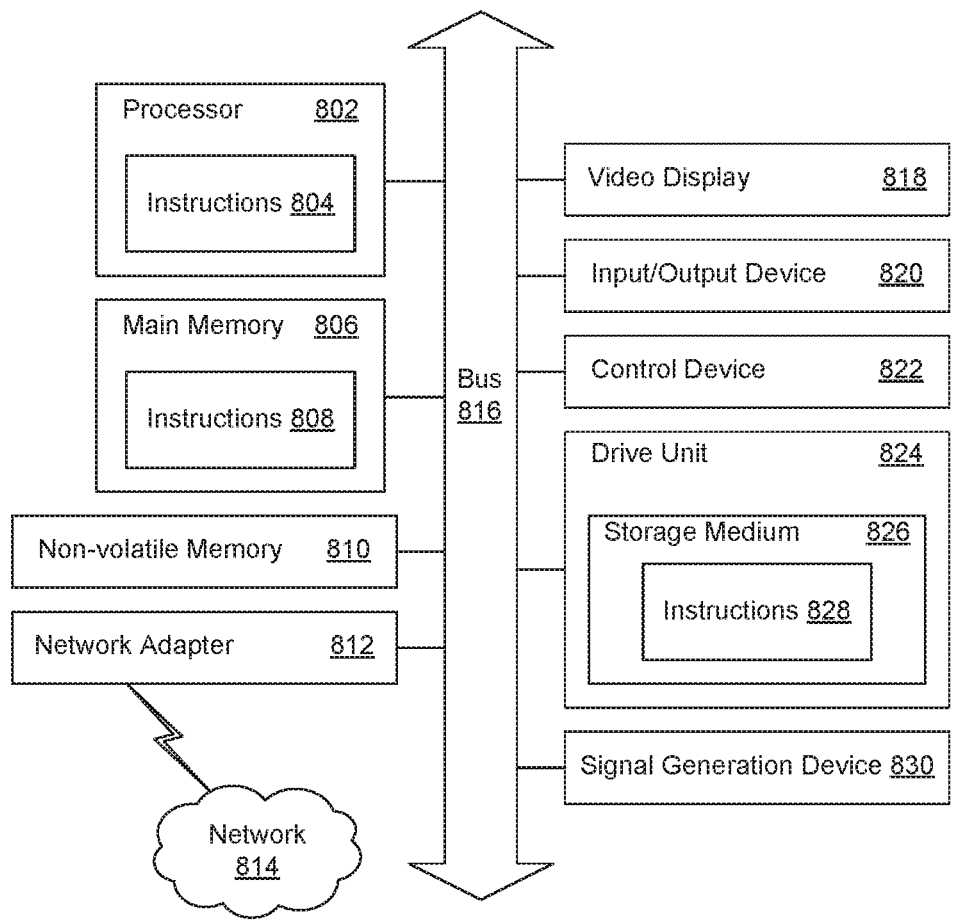
FIG. 8 is a high-level block diagram of a computing system that can be used to facilitate at least some of the techniques described herein.

FIG. 8 is a block diagram illustrating an example of a computing system 800 in which at least some operations described herein can be implemented. The computing system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 800 operates as a standalone device, although the computing system 800 may be connected (e.g., wired or wirelessly) to other machines. In a networked deployment, the computing system 800 may operate in the capacity of a server or a client machine in a client-server network environment, or as a peer machine in a peer-to-peer (or distributed) network environment.

The computing system 800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the computing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 810, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 812 enables the computing system 800 to mediate data in a network 814 with an entity that is external to the computing device 800, through any known and/or convenient communications protocol supported by the computing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A non-transitory computer-readable storage medium storing instructions, execution of which by a processor causes the processor to perform operations comprising:
   identifying a set of filtering rules to be used to filter data packets representing traffic in a computer network;
   distributing the set of filtering rules amongst a first network appliance and a second network appliance;
   monitoring space available in the first network appliance;
   determining that space has become consumed in the first network appliance; and
   in response to said determining,
     causing exportation of a filtering rule from the first network appliance to the second network appliance.

2. The non-transitory computer-readable medium of claim 1, wherein said distributing is automatically performed by the first network appliance based on a characteristic of each filtering rule.

3. The non-transitory computer-readable medium of claim 2, wherein the set of filtering rules are distributed amongst the first network appliance and the second network appliance such that data packets of a specified type are filtered using either a first subset of filtering rules on the first network appliance or a second subset of filtering rules on the second network appliance.

4. The non-transitory computer-readable medium of claim 1, wherein said distributing is performed by the first network appliance in response to receiving user input specifying where each filtering rule should reside.

5. The non-transitory computer-readable medium of claim 1, wherein the operations further comprise:
   recommending a distribution scheme to a user;
   receiving user input indicative of a confirmation of the distribution scheme,
     wherein said distributing is performed in response to receiving the user input.

6. The non-transitory computer-readable medium of claim 1, wherein the first network appliance includes a first subset of filtering rules stored in a first ternary content-addressable memory (TCAM) and the second network appliance includes a second subset of filtering rules stored in a second TCAM.

7. The non-transitory computer-readable medium of claim 1, wherein said exporting occurs in response to a determination that the number of filtering rules in the first network appliance exceeds a specified threshold.

8. The non-transitory computer-readable medium of claim 1, wherein said monitoring is performed continually in real time.

9. The non-transitory computer-readable medium of claim 8, wherein said importing occurs in response to a determination that the number of filtering rules in the first network appliance has fallen below a specified threshold.

10. The non-transitory computer-readable medium of claim 1, wherein the operations further comprise:
    determining that space has become available in the first network appliance; and
    in response to said determining,
      importing a filtering rule from the second network appliance to the first network appliance.

11. A network appliance comprising:
    an ingress port;
    an egress port;
    a memory configured to store a first set of filtering rules; and
    a processor operable to execute program code, execution of which causes the network appliance to:
      determine whether a data packet received at the ingress port should be filtered using the first set of filtering rules or a second set of filtering rules stored in a second network appliance;
      in response to a determination that the data packet should be filtered using the first set of filtering rules, applying a first filtering rule of the first set of filtering rules to the data packet; and
        forwarding the data packet to the egress port for transmission to the second network appliance;
      in response to a determination that the data packet should be filtered using the second set of filtering rules, forwarding the data packet to the egress port for transmission to the second network appliance.

12. The network appliance of claim 11, the process further including:
tagging the data packet with an identifier associated with the ingress port in a storage facility,
wherein said determining is based on the identifier with which the data packet is tagged.

13. The network appliance of claim 12, wherein the identifier is a metadata field appended to the data packet that represents a Virtual Local Area Network (VLAN) identifier assigned to the data packet by the network appliance.

14. The network appliance of claim 11, the process further including:
dynamically changing where a particular filtering rule in the first set of filtering rules or the second set of filtering rules resides by performing at least one of:
exporting the particular filtering rule from the network appliance to the second network appliance; or
importing the particular filtering rule from the second network appliance to the network appliance.

15. The network appliance of claim 14, wherein said exporting occurs in response to a determination that the number of filtering rules in the memory exceeds a first specified threshold, and wherein said importing occurs in response to a determination that the number of filtering rules in the memory falls below a second specified threshold.

16. The network appliance of claim 11, wherein the network appliance and the second network appliance are part of a network traffic visibility fabric in a computer network.

17. The network appliance of claim 16, wherein the network traffic visibility fabric does not include a source node from which the data packet is received or a destination node to which the data packet is transmitted after being filtered by the network appliance or the second network appliance.

18. A method comprising:
receiving input indicative of user input specifying a set of filtering rules;
distributing the set of filtering rules amongst an ingress network appliance and a non-ingress network appliance of a plurality of network appliances in a network traffic visibility fabric; and
dynamically changing where the set of filtering rules reside by performing at least one of:
exporting a filtering rule from the ingress network appliance to the non-ingress network appliance; or
importing a filtering rule from the non-ingress network appliance to the ingress network appliance.

19. The method of claim 18, wherein said exporting is performed in response to a determination that space of a ternary content-addressable memory (TCAM) has become exhausted in the ingress network appliance.

20. The method of claim 18, wherein said importing is performed in response to a determination that space of a ternary content-addressable memory (TCAM) has become available in the ingress network appliance.

* * * * *